(12) United States Patent
Chen

(10) Patent No.: US 10,445,961 B1
(45) Date of Patent: Oct. 15, 2019

(54) WIRELESS DOOR LOCK DEVICE AND BIOMETRIC DOOR LOCK CONTROLLING SYSTEM HAVING THE WIRELESS DOOR LOCK DEVICE

(71) Applicant: Tse-Hsing Chen, Taipei (TW)

(72) Inventor: Tse-Hsing Chen, Taipei (TW)

( * ) Notice: Subject to any disclaimer, the term of this patent is extended or adjusted under 35 U.S.C. 154(b) by 0 days.

(21) Appl. No.: 16/029,962

(22) Filed: Jul. 9, 2018

(30) Foreign Application Priority Data

Mar. 29, 2018 (TW) .............................. 107204076 U

(51) Int. Cl.
*G07C 9/00* (2006.01)
*H04W 12/06* (2009.01)

(52) U.S. Cl.
CPC ..... *G07C 9/00563* (2013.01); *G07C 9/00309* (2013.01); *H04W 12/06* (2013.01); *G07C 9/00158* (2013.01); *G07C 2009/00769* (2013.01)

(58) Field of Classification Search
None
See application file for complete search history.

(56) References Cited

U.S. PATENT DOCUMENTS

| | | | | |
|---|---|---|---|---|
| 2008/0150683 | A1* | 6/2008 | Mikan ................ | G07C 9/00309 340/5.31 |
| 2009/0010503 | A1* | 1/2009 | Mathiassen ........... | B60R 25/252 382/125 |
| 2011/0225433 | A1* | 9/2011 | Wan ........................ | E05B 17/22 713/190 |
| 2015/0279132 | A1* | 10/2015 | Perotti ............... | G07C 9/00309 340/5.52 |
| 2017/0180539 | A1* | 6/2017 | Payack, Jr. ....... | H04M 1/72533 |

* cited by examiner

*Primary Examiner* — Carlos Garcia
(74) *Attorney, Agent, or Firm* — Behmke Innovation Group LLC; James Behmke; Stephen D. LeBarron

(57) ABSTRACT

A wireless door lock device and a biometric door lock controlling system are provided. The biometric door lock controlling system includes: a door lock controlling device and a mobile device carrier in wireless transmission communication therewith. The door lock controlling device includes a power supply module, a control circuit module, a communication circuit module, a drive circuit module and a drive motor. The mobile device carrier is installed with an application, a biometric module and an application communication module. After a wireless handshake is established between the application communication module and the communication circuit module and the biometric module authenticates a biometric identifier, an encrypted control signal including a lock or unlock instruction is transmitted by the application communication module via the communication circuit module to the control circuit module for the control circuit module to actuate the drive motor through the drive circuit module to perform locking or unlocking.

12 Claims, 5 Drawing Sheets

WIRELESS DOOR LOCK DEVICE AND BIOMETRIC DOOR LOCK CONTROLLING SYSTEM HAVING THE WIRELESS DOOR LOCK DEVICE

TECHNICAL FIELD

The present disclosure relates to door lock systems, and, more particularly, to a door lock controlling system for actuating locking or unlocking using biometric authentication.

BACKGROUND

With the popularization of semiconductor chips, sensing devices are being used in a myriad of industries, including anti-theft apparatuses on door locking devices.

In addition to using physical keys, sensing chips, etc. to achieve anti-theft and convenience on conventional door locking devices, biometric recognition is being adopted, such as fingerprint, retina and facial recognition, to further authenticate the person opening the door lock device is the user himself/herself, thereby offering personalization. However, door lock devices for installing a biometric lock are generally expensive, adding to it is the fact that the installation cost for installing a biometric door lock device far exceeds the cost for installing a standard door lock device. Furthermore, facial or iris recognition is also high in material and installation cost. Fitting the device at an appropriate height can be troublesome as it has to fit the height of the user. As a result, door lock devices with facial recognition are not widely adopted at present.

If the above-described biometric door lock devices are applied to vehicles, it becomes even more expensive and difficult to install as they have to be installed in more confined spaces. Another factor that needs to be taken into consideration is the water protection of the device. Thus, installing a sensor and its associated apparatus on the exterior of a vehicle is faced with difficulties. In addition, a number of factors need to be considered when a biometric door lock device is used in a vehicle. For example, when it is dusty, raining or snowing outside, the sensor is still expected to perform biometric recognition even though it might be covered by dust, rain or snow.

Not to mention the fact that installation height, installation angle and location of a door lock device with facial or iris recognition on a vehicle may vary depending on individual users, creating challenges for equipping vehicles with such devices.

SUMMARY

In view of the aforementioned shortcomings of the prior art, the present disclosure provides a biometric door lock controlling system, which may include: a door lock controlling device including a power supply module, a control circuit module connected with the power supply module, a communication circuit module connected with the control circuit module, a drive circuit module configured by the control circuit module and a drive motor controlled by the drive circuit module; and a mobile device carrier in wireless transmission communication with the door lock controlling device installed with an application (e.g., performing handshakes by radio signals), the application including a biometric module for controlling biometric identification of the mobile device carrier and an application communication module for controlling communication of the mobile device carrier, such that once a wireless handshake is established between the application communication module of the mobile device carrier and the communication circuit module of the door lock controlling device and a biometric identifier is authenticated by the biometric module, an encrypted control signal including a lock or unlock instruction is transmitted by the application communication module to the communication circuit module, the encrypted control signal is decrypted by the communication circuit module, the lock or unlock instruction is received by the control circuit module, and the drive motor is actuated by the drive circuit module for performing locking or unlocking.

In an embodiment, the wireless handshake established between the application communication module of the mobile device carrier and the communication circuit module of the door lock controlling device adopts a communication protocol of Wi-Fi, Li-Fi, Bluetooth, Wireless USB, NFC, RFID, TransferJet, DSRC, EnOcean, ZigBee, UWB, GSM or WiMAX.

In an embodiment, the biometric module is selected from any one of a camera used for recognizing a face, a retina or an iris, a fingerprint sensor used for recognizing fingerprints, a receptor for recognizing voiceprints, an image sensor used for recognizing veins, and a combination thereof.

In an embodiment, the mobile device carrier is configured to transmit the encrypted control signal to the wirelessly handshaken door lock controlling device via Internet and/or GSM, so as to remotely actuate the drive motor for performing locking or unlocking.

In an embodiment, the application of the mobile device carrier includes a user interface providing locking and unlocking control options for selection, such that the mobile device carrier is configured to transmit the encrypted control signal including a lock or unlock instruction when the biometric module authenticates the biometric identifier.

In an embodiment, the application communication module of the mobile device carrier is configured to control a plurality of different door lock controlling devices by recording details of the wireless handshakes.

In an embodiment, the drive motor is configured to actuate a lock tongue connected with the drive motor to project or retract for performing locking or unlocking.

The present disclosure further provides a wireless door lock device, which may include: a power supply module; a control circuit module connected with the power supply module; a communication circuit module connected with the control circuit module; a drive circuit module configured by the control circuit module; and a drive motor controlled by the drive circuit module, such that once a wireless handshake is established between the communication circuit module of the wireless door lock device and a mobile device carrier and a biometric identifier is authenticated by a biometric module provided by the mobile device carrier, an encrypted control signal including a lock or unlock instruction is transmitted by the mobile device carrier via the communication circuit module of the wireless door lock device to the control circuit module for the control circuit module of the wireless door lock device to control the drive circuit module so as to actuate the drive motor for performing locking or unlocking.

In an embodiment, the wireless handshake established between the wireless door lock device and the mobile device carrier is configured to adopt a communication protocol of Wi-Fi, Li-Fi, Bluetooth, Wireless USB, NFC, RFID, TransferJet, DSRC, EnOcean, ZigBee, UWB, GSM or WiMAX.

In an embodiment, the biometric module of the mobile device carrier is selected from any one of a camera for recognizing a face, a retina or an iris, a fingerprint sensor for recognizing fingerprints, a receptor for recognizing voiceprints, an image sensor for recognizing veins, and a combination thereof.

In an embodiment, the mobile device carrier is configured to transmit the encrypted control signal to the wirelessly handshaken door lock device via Internet to remotely actuate the drive motor for performing locking or unlocking.

In an embodiment, the wireless door lock device is controlled by locking and unlocking options provided by a user interface of the mobile device carrier.

In an embodiment, the wireless door lock device is controlled by a plurality of mobile device carriers through wireless handshakes.

In an embodiment, the drive motor is configured to actuate a lock tongue connected with the drive motor to project or retract for performing the locking or unlocking.

The biometric door lock controlling system and the wireless door lock device according to the present disclosure require no additional biometric sensor installed on a door lock, thereby saving costs by eliminating the expensive biometric sensor. The installation of a biometric sensor can be time consuming and costly, so that by eliminating the need for installing one, the system of the present disclosure is able to save on labor cost and time, while also eliminating additional power consumption required for keeping the biometric sensor in operation. Moreover, it offers concealment as it would be impossible for thieves to know where the sensor is and thus has no idea on how to break it.

According to the present disclosure, after handshaking is carried out between the mobile device carrier and the door lock controlling device through a communication protocol to determine that the matching pair of the mobile device carrier and the door lock controlling device is correct, biometric identification is performed and an encrypted control signal is transmitted for locking or unlocking. Compared to the existing locks equipped with biometric sensors, the present disclosure can provide more anti-theft protection and security.

Moreover, the mobile device carrier may, via the application, display and record when a locking or unlocking event of a handshaken door lock controlling device has taken place, and may also provide the abilities to activate or deactivate an anti-theft alarm, receive an anti-theft disenabled signal, perform handshake or cancel handshake, or control a plurality of different door lock controlling devices. The same door lock controlling device may also be controlled by a plurality of different mobile device carriers.

DETAILED DESCRIPTION OF THE EMBODIMENTS

Figure 1:
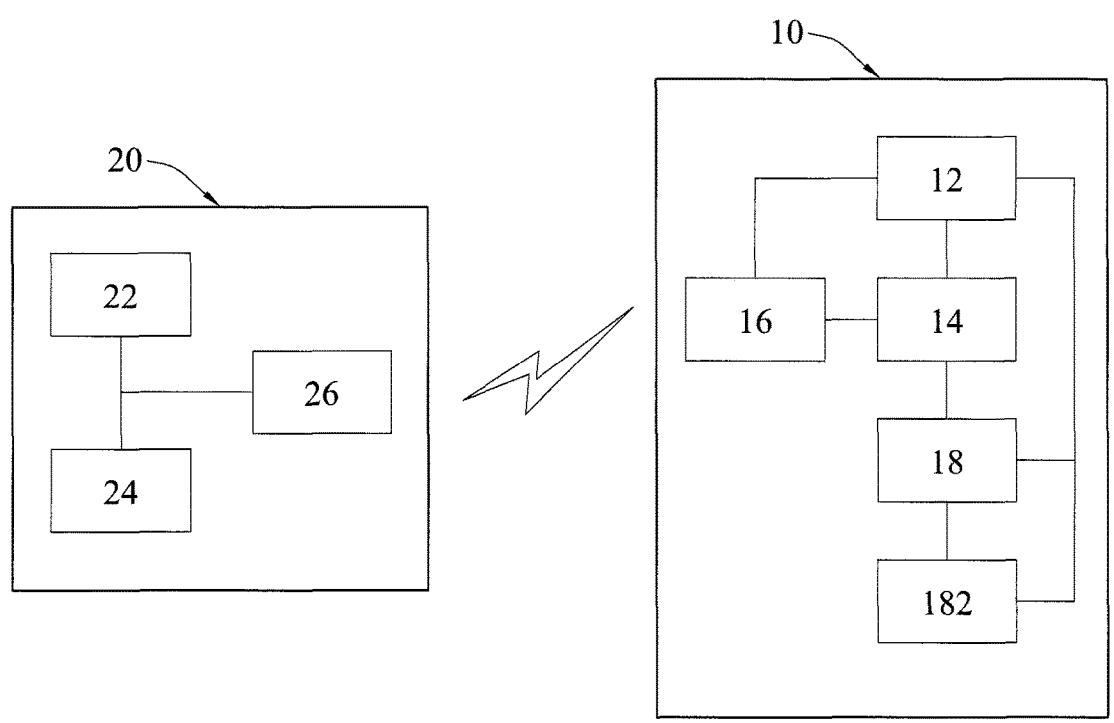
FIG. 1 is a schematic diagram depicting system layout of a biometric door lock controlling system in accordance with the present disclosure.

The present disclosure is described with reference to the following specific descriptions and exemplary embodiments. Such descriptions and embodiments are used only to illustrate non-limiting implementations of the present disclosure.

It should be noted that the structures, ratios, sizes shown in the drawings appended to this specification are to be construed in conjunction with the disclosure of this specification in order to facilitate understanding of one with ordinary skills in the art. They are not meant, in any ways, to limit the implementations of the present disclosure, and therefore have no substantial technical meaning. Without affecting the effects created and objectives achieved by the present disclosure, any modifications, changes or adjustments to the structures, ratio relationships or sizes, are to be construed as fall within the range covered by the technical contents disclosed herein. Meanwhile, terms, such as "exterior", "interior", "inside", "outside", and the like, are for illustrative purposes only, and are not meant to limit the range implementable by the present disclosure. Any changes or adjustments made to their relative relationships, without modifying the substantial technical contents, are also to be construed as within the range implementable by the present disclosure.

The present disclosure includes a wireless door lock device and a biometric door lock controlling system with the wireless door lock device. FIG. 1 is a schematic diagram illustrating an embodiment of the present disclosure, which includes at least a door lock controlling device 10 and at least one mobile device carrier 20, wherein the door lock controlling device 10 and the mobile device carrier 20 are in wireless transmission communication.

Figure 3:
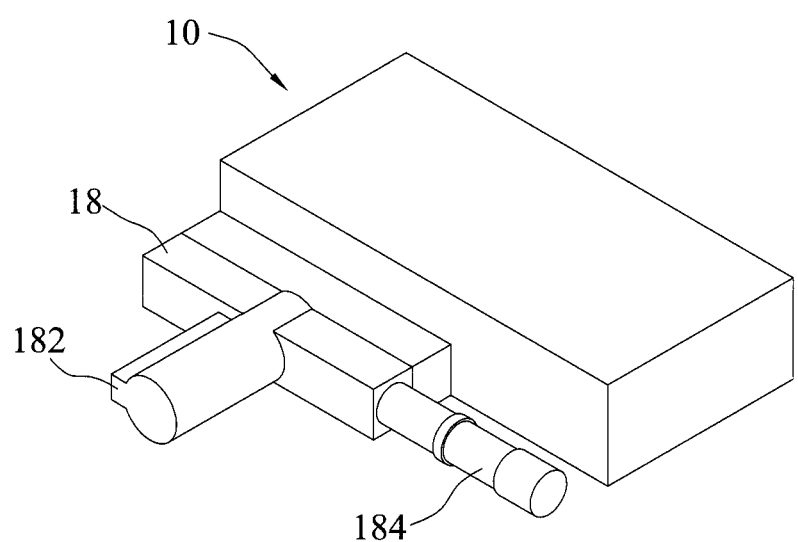
FIG. 3 is a schematic diagram illustrating a door lock controlling device of a biometric door lock controlling system in operation in accordance with the present disclosure.

The door lock controlling device 10 includes a power supply module 12, a control circuit module 14, a communication circuit module 16 and a drive circuit module 18. The power supply module 12 of the door lock controlling device 10 can be an independent battery pack, connected to an external household supply mains, or other types of power supplying device. The control circuit module 14 is connected to the power supply module 12, the communication circuit module 16 and the drive circuit module 18. The control circuit module 14 dispatches the power supplied by the power supply module 12 to the communication circuit module 16 and the drive circuit module 18, and determines the standby and waking up of the communication circuit module 16. The communication circuit module 16 is connected to the power supply module 12 and may perform handshakes with external communication devices through communication protocols, such as Wi-Fi, Li-Fi, Bluetooth, Wireless USB, NFC, RFID, TransferJet, DSRC, EnOcean, ZigBee, UWB, GSM or WiMAX. This embodiment is illustrated using Bluetooth as an example, but is not limited to this. The drive circuit module 18 is configured by the control circuit module 14 to control various parameters of a drive motor 182. The drive motor 182 can be a stepper motor or a servo motor and its rotational speed, torque or output torque is controlled by the drive circuit module 18. The drive motor 182 is connected to a lock tongue 184 (shown in FIG. 3) via a screw rod (not shown). The drive motor 182 drives the lock tongue 184 to telescopically move in or out of a keyhole of a door frame to achieve locking or unlocking.

Figure 2:
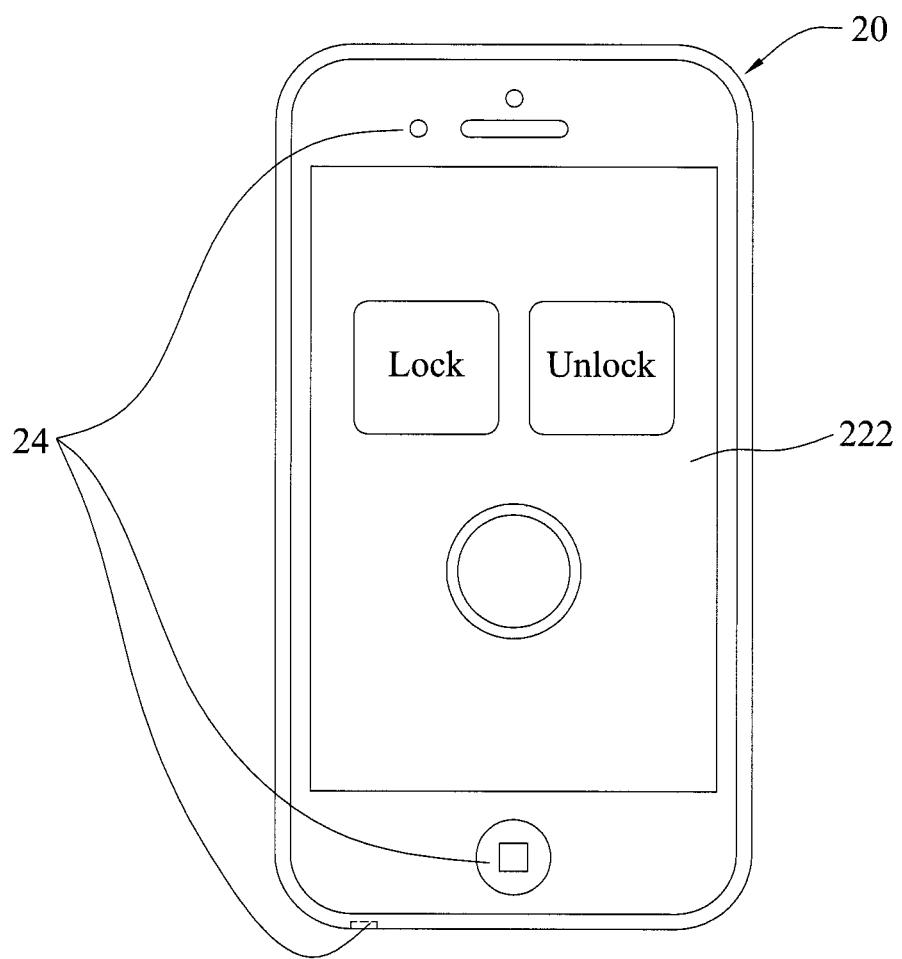
FIG. 2 is a schematic diagram depicting a mobile device carrier and its user interface of a biometric door lock controlling system in accordance with the present disclosure.
Figure 4:
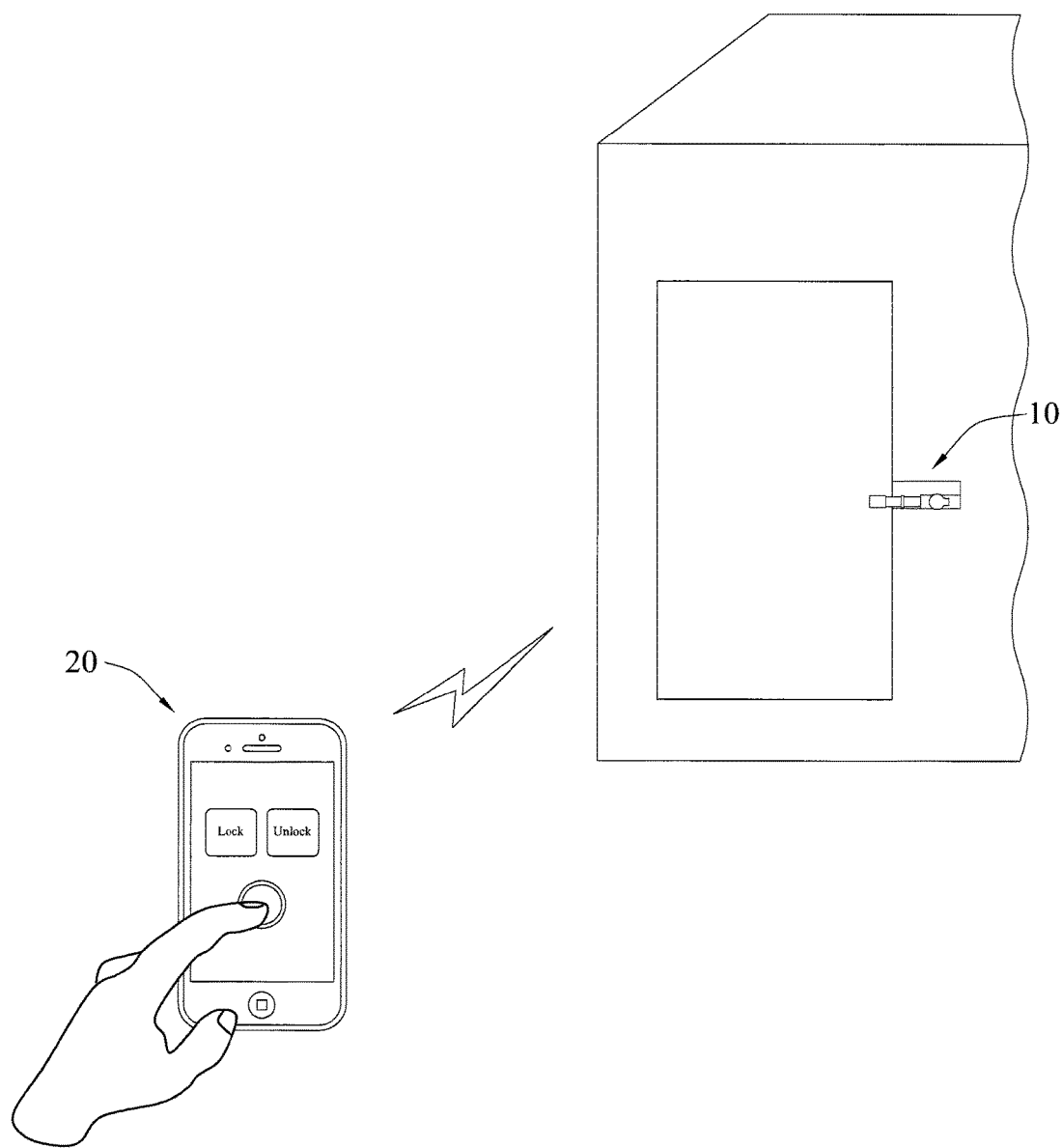
FIGS. 4 and 5 are schematic diagrams illustrating a biometric door lock controlling system in use in accordance with the present disclosure.
Figure 5:
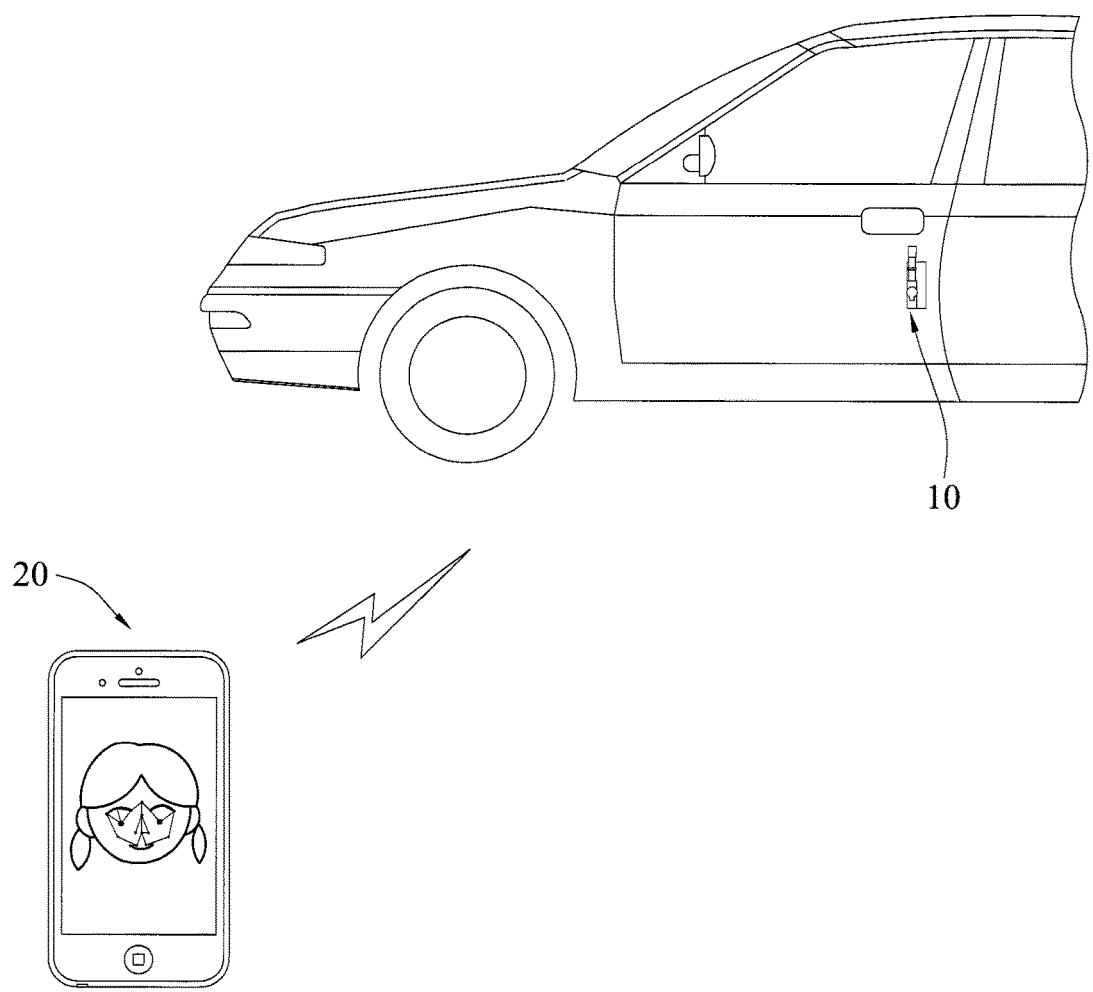

As shown in FIGS. 1 and 2, the mobile device carrier 20 includes an application 22, a biometric module 24 and an application communication module 26. As shown in FIG. 2, the mobile device carrier 20 can be implemented by a smartphone, a tablet PC, or the like, and is installed with the application 22 and a user interface 222 provided from the application 22. The biometric module 24 and the application communication module 26 are included in the mobile device carrier 20. The application 22 controls the biometric functionality of the biometric module 24 of the mobile device carrier 20, which can be facial recognition, retina recognition, iris recognition, fingerprint recognition, voiceprint recognition or even vein recognition. A front or back camera equipped on the mobile device carrier 20 can be used for facial, retina or iris recognition. A fingerprint sensor equipped on the mobile device carrier 20, which can be capacitive or optical, can be used for fingerprint recognition. The mobile device carrier 20 can be equipped with a near-infrared image sensor for vein recognition. As shown in FIGS. 4 and 5, fingerprint and iris recognition are used as examples according to the present disclosure; however, the present disclosure is not limited to these. A user may make use of a composite biometric module 24 depending on the requirements of the application 22, for example, a combination of fingerprint and facial recognitions, to achieve multiple security protections. When the application communication module 26 of the mobile device carrier 20 performs wireless handshakes with the communication circuit module 16 of the door lock controlling device 10, a wireless local area network (WLAN) communication protocol, such as Wi-Fi, Li-Fi, Bluetooth, Wireless USB, NFC, RFID, TransferJet, DSRC, EnOcean, ZigBee, UWB, GSM or WiMAX, can be used; however, the present disclosure is not limited to these, a remote wide area network (WAN) communication protocol, such as GSM or WiMAX, is equally applicable.

Referring to FIGS. 4 and 5, the door lock controlling device 10 according to the present disclosure is applicable in door locks for homes or offices, door locks for vehicles, or any type of apparatus that requires a lock, such as a safe, a locker, a drawer, etc. A wireless handshake initiated by a user is first performed between the application communication module 26 of the mobile device carrier 20 and the communication circuit module 16 of the door lock controlling device 10, and the handshaken door lock controlling device 10 is recorded in the mobile device carrier 20. Once the biometric identifier of the user is authenticated by the biometric module 24, for example, through fingerprint recognition of FIG. 4 or facial recognition of FIG. 5, an unlock and/or a lock option(s) are provided by the user interface 222 of the application 22 of the mobile device carrier 20 (shown in FIG. 2). After the user selects a control option (unlock or lock) and the biometric identifier corresponds to pre-registered data to ensure that there is a match determined by the mobile device carrier 20 via the biometric module 24, an encrypted control signal containing an unlock or lock instruction is transmitted by the application communication module 26 to the communication circuit module 16 of the door lock controlling device 10. The signal is decrypted by the communication circuit module 16 and the unlock or lock instruction is transmitted to the control circuit module 14 for controlling the drive circuit module 18 in order to actuate the drive motor 182, thereby driving the lock tongue to project or retract to perform locking or unlocking, respectively.

The biometric door lock controlling system according to the present disclosure further allows the mobile device carrier 20 to transmit encrypted control signals to the handshaken door lock controlling device 10 via Internet, such as GSM or WiMAX, thereby remotely actuating the drive motor 182 to perform unlocking or locking. For example, a user inside a building may wish to allow a freight staff to come into the building can do so by using the method described above.

In addition, the biometric door lock controlling system according to the present disclosure records the details of the wirelessly handshaken door lock controlling device 10 via the mobile device carrier 20. As a result, a plurality of door lock controlling devices 10 can be controlled, and a door lock controlling device 10 with which the mobile device carrier 20 previously performed wireless handshake can be selected by the user for quick locking or unlocking.

The biometric door lock controlling system and the wireless door lock device according to the present disclosure requires no additional biometric sensor installed on a door lock, saving costs by eliminating the expensive biometric sensor. The installation of a biometric sensor can be time consuming and costly, so by eliminating the need for installing one, the system according to the present disclosure is able to save on labor cost and time, while also eliminating additional power consumption required for keeping the biometric sensor in operation.

As an additional biometric sensor is not required, there will be no physical sensor around the door lock. It would be impossible for thieves to know where the sensor is and thus has no idea on how to break it, thereby achieving concealment.

Existing biometric sensors are generally expensive, and provide anti-theft biometric identification. However, if a biometric sensor is compromised or damaged, the lock associated with it can be easily opened. On the contrary, according to the present disclosure after handshaking is carried out between a smartphone of the mobile device carrier 20 and the door lock controlling device 10 through a communication protocol to determine that the matching pair of the mobile device carrier 20 and the door lock controlling device 10 is correct, biometric identification is performed and an encrypted control signal is transmitted for locking or unlocking. Compared to the existing locks with biometric sensors, the present disclosure can provide more anti-theft protection.

In an embodiment, the mobile device carrier 20 may, via the application 22, display and record when a locking or unlocking event of a handshaken door lock controlling device 10 had taken place, and may also provide the abilities to activate or deactivate an anti-theft alarm, receive an anti-theft disenabled signal, perform handshake or cancel handshake, or control a plurality of different door lock controlling devices 10. The same door lock controlling device 10 may also be controlled by a plurality of different mobile device carriers 20.

The above descriptions are set forth to illustrate one or more possible embodiments according to the present disclosure, and should not be construed as to limit the present disclosure in any way. The above embodiments can be modified by those with ordinary skills in the art without departing from the scope of the present disclosure as defined in the following appended claims.

In view of the above, the present disclosure is submitted to be not only novel in terms of technical ideas, but also possess numerous advantageous technical effects over the prior art, and is believed to meet the requirements of novelty and non-obviousness for patentability.

What is claimed is:

1. A biometric door lock controlling system, comprising:
   a door lock controlling device including a power supply module, a control circuit module connected with the power supply module, a communication circuit module connected with the control circuit module, a drive circuit module configured by the control circuit module, and a drive motor controlled by the drive circuit module; and a mobile device carrier in wireless transmission communication with the door lock controlling device, the mobile device carrier installed with an application, the application including a biometric module for controlling biometric identification of the mobile device carrier and an application communication module for controlling communication of the mobile device carrier, such that once a wireless handshake is established between the application communication module of the mobile device carrier and the communication circuit module of the door lock controlling device and a biometric identifier is authenticated by the biometric module, an encrypted control signal including a lock or unlock instruction is transmitted by the application communication module to the communication circuit module for the encrypted control signal to be decrypted by the communication circuit module, the lock or unlock instruction is received by the control circuit module, and the drive motor is actuated by the drive circuit module for performing locking or unlocking, wherein the application communication module of the mobile device carrier is configured to control a plurality of different door lock controlling devices by recording details of the wireless handshakes, and wherein the application of the mobile device carrier includes a user interface providing locking and unlocking control options for selection, such that the mobile device carrier is configured to transmit the encrypted control signal including the lock or unlock instruction when the biometric module authenticates the biometric identifier.

2. The biometric door lock controlling system of claim 1, wherein the wireless handshake established between the application communication module of the mobile device carrier and the communication circuit module of the door lock controlling device adopts a communication protocol of Wi-Fi, Li-Fi, Bluetooth, Wireless USB, NFC, RFID, TransferJet, DSRC, EnOcean, ZigBee, UWB, GSM or WiMAX.

3. The biometric door lock controlling system of claim 1, wherein the biometric module is selected from any one of a camera used for recognizing a face, a retina or an iris, a fingerprint sensor used for recognizing fingerprints, a receptor used for recognizing voiceprints, an image sensor for recognizing veins, and a combination thereof.

4. The biometric door lock controlling system of claim 1, wherein the mobile device carrier is configured to transmit the encrypted control signal to the wirelessly handshaken door lock controlling device via Internet, so as to remotely actuate the drive motor for performing locking or unlocking.

5. The biometric door lock controlling system of claim 1, wherein the drive motor is configured to actuate a lock tongue connected with the drive motor to project or retract for performing locking or unlocking.

6. A wireless door lock device, comprising:
a power supply module;
a control circuit module connected with the power supply module;
a communication circuit module connected with the control circuit module;
a drive circuit module configured by the control circuit module; and
a drive motor controlled by the drive circuit module,
such that once a wireless handshake is established between the communication circuit module of the wireless door lock device and a mobile device carrier and a biometric identifier is authenticated by a biometric module provided by the mobile device carrier, an encrypted control signal including a lock or unlock instruction is transmitted by the mobile device carrier to the communication circuit module of the wireless door lock device, the encrypted control signal is decrypted by the communication circuit module, and the lock or unlock instruction is received by the control circuit module to actuate the drive motor via the drive circuit module for performing locking or unlocking,
wherein the mobile device carrier controls the wireless door lock device by recording details of the wireless handshake, and wherein an application of the mobile device carrier includes a user interface providing locking and unlocking control options for selection, such that the mobile device carrier is configured to transmit the encrypted control signal including the lock or unlock instruction when the biometric module authenticates the biometric identifier.

7. The wireless door lock device of claim 6, wherein the wireless handshake established between the wireless door lock device and the mobile device carrier is configured to adopt a communication protocol of Wi-Fi, Li-Fi, Bluetooth, Wireless USB, NFC, RFID, TransferJet, DSRC, EnOcean, ZigBee, UWB, GSM or WiMAX.

8. The wireless door lock device of claim 6, wherein the biometric module of the mobile device carrier is selected from any one of a camera for recognizing a face, a retina or an iris, a fingerprint sensor for recognizing fingerprints, a receptor for recognizing voiceprints, an image sensor for recognizing veins, and a combination thereof.

9. The wireless door lock device of claim 6, wherein the mobile device carrier is configured to transmit the encrypted control signal to the wirelessly handshaken door lock device via Internet to remotely actuate the drive motor for performing locking or unlocking.

10. The wireless door lock device of claim 6, wherein the wireless door lock device is controlled by locking and unlocking options provided by a user interface of the mobile device carrier.

11. The wireless door lock device of claim 6, wherein the wireless door lock device is controlled by a plurality of mobile device carriers through wireless handshakes.

12. The wireless door lock device of claim 6, wherein the drive motor is configured to actuate a lock tongue connected with the drive motor to project or retract for performing the locking or unlocking.

* * * * *